United States Patent [19]
Ehrlinger et al.

[11] Patent Number: 4,685,343
[45] Date of Patent: Aug. 11, 1987

[54] POWERSHIFT GEARBOX/TRANSMISSION

[75] Inventors: Friedrich J. Ehrlinger; Franz Müller; Herbert Simon, all of Friedrichshafen; Hubert Sailer, Markdorf, all of Fed. Rep. of Germany

[73] Assignee: Zahnradfabrik Friedrichshafen AG, Friedrichshafen, Fed. Rep. of Germany

[21] Appl. No.: 737,348

[22] PCT Filed: Jul. 17, 1984

[86] PCT No.: PCT/EP84/00219
§ 371 Date: May 15, 1985
§ 102(e) Date: May 15, 1985

[87] PCT Pub. No.: WO85/01335
PCT Pub. Date: Mar. 28, 1985

[30] Foreign Application Priority Data
Sep. 15, 1983 [WO] PCT Int'l Appl. .............. PCT/EP83/00241

[51] Int. Cl.⁴ ............................................. F16H 3/08
[52] U.S. Cl. ...................................... 74/331; 74/359
[58] Field of Search ............... 74/360, 359, 331, 369, 74/366, 325, 372

[56] References Cited
U.S. PATENT DOCUMENTS

| | | | |
|---|---|---|---|
| 2,825,232 | 3/1958 | Sieving et al. | 74/360 X |
| 2,972,899 | 2/1961 | Wiggermann | 74/331 X |
| 2,991,661 | 7/1961 | Rambausek | 74/330 |
| 3,400,601 | 9/1968 | Ruhl et al. | 74/360 X |
| 3,802,293 | 4/1974 | Winckler et al. | 74/331 X |
| 4,031,762 | 6/1977 | Shellberg | 74/331 X |
| 4,033,197 | 7/1977 | Shikiya et al. | 74/360 X |
| 4,461,188 | 7/1984 | Fisher | 74/331 X |
| 4,481,836 | 11/1984 | Richards | 74/331 |
| 4,544,057 | 10/1985 | Webster et al. | 74/359 X |

FOREIGN PATENT DOCUMENTS

| | | | |
|---|---|---|---|
| 2056521 | 5/1972 | Fed. Rep. of Germany . | |
| 2083843 | 12/1971 | France . | |
| 2109790 | 5/1972 | France . | |
| 2510492 | 2/1983 | France . | |
| 2069635 | 8/1981 | United Kingdom | 74/331 |
| 740543 | 6/1980 | U.S.S.R. | 74/331 |

Primary Examiner—Lawrence Staab
Assistant Examiner—Dwight G. Diehl
Attorney, Agent, or Firm—Karl F. Ross; Herbert Dubno; Ronald Lianides

[57] ABSTRACT

Powershift transmission especially for tractors, constructed in sections with a multispeed main transmission, a reversing transmission and a range-change transmission with synchronizing clutches, with two power branches having two additional friction clutches which are structurally connected to a double clutch arranged coaxially with the free gears of the main transmission and axial between these free gears.

8 Claims, 3 Drawing Figures

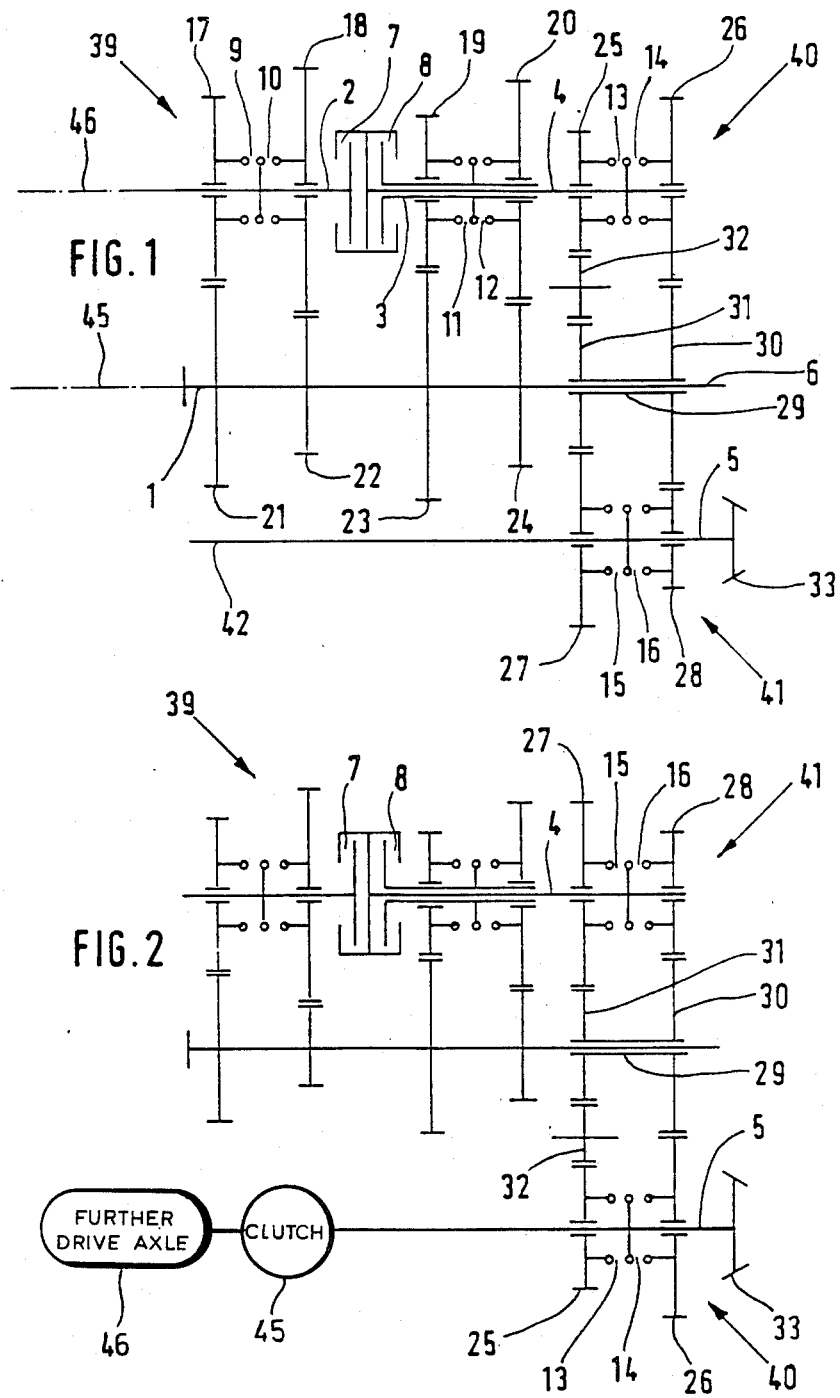

POWERSHIFT GEARBOX/TRANSMISSION

FIELD OF THE INVENTION

The invention relates to a powershift gearbox/transmission constructed in sections with a multispeed main transmission, a reversing transmission, a range-change transmission, with shafts, fixed and free gears and synchronizing clutches each with an additional power shiftable friction clutch in two power branches constructed such that the shafts of both power branches are all arranged on two axes.

BACKGROUND OF THE INVENTION

A transmission of this type is known from the German open application No. 32 28 353, FIG. 16. It requires for eight drive speeds and eight reverse speeds a total of 23 gears, 11 gear sets and 10 synchronizing clutches. The friction clutches are separately mounted as two complete individual clutches on two different axes. Two synchronizing clutches of the main transmission are loaded not only by a shaft and the thereto rigidly connected parts of a friction clutch and two synchronizing clutches, but in addition also by four gears constituting a turning mass. The synchronizing clutches of the reverse transmission are loaded by the turning mass of two shafts, of parts of six synchronizing clutches and of a totality of ten gears.

A disadvantage of the corresponding transmission is the size of the mentioned synchronizing clutches or, if not, of their reduced lifespan.

Other disadvantages are the large number of gears and gear sets synchronous clutches, the many and long shafts and therefrom the expensive overall dimensions and weight of the transmission.

OBJECT OF THE INVENTION

It is an object of this invention to improve a transmission of this type to obviate the aforementioned disadvantages.

SUMMARY OF THE INVENTION

This object is achieved, according to the invention in a powershift transmission, especially for tractors, constructed in sections, with a multispeed main transmission, a reversing transmission and a range change transmission, having shafts, fixed gears, free gears and synchronizing clutches and each of them having an additional power shiftable friction clutch in two power branches such that the shafts of both power branches are all arranged on two axes. According to the invention:
- both friction clutches are structurally connected to a double clutch with two primary shafts and an output shaft axially arranged between the two primary shafts;
- the free gears of the main transmission are arranged on both primary shafts of the double clutch; and
- the fixed gears of the main transmission are arranged on the primary shaft of the main transmission.

The resulting transmission has the advantage of significantly reduced structure because a series of parts of the double clutch can be commonly used for both friction clutches and therefore have to be provided only once. It has further the advantage that none of the synchronizing clutches of the main transmission is additionally loaded by the turning mass of four gears.

The free gears of the reversing transmission can be arranged on the output shaft of the double clutch while the free gears of the range-change transmission are arranged on the output shaft of the gear-shift transmission and the reversing transmission and the range-change transmission can have a common intermediate shaft with two fixed gears. The reversing transmission and the range-change transmission can have sychronizing clutches.

Alternatively the free gears of the range-change transmission are arranged on the output shaft of the double clutch, the free gears of the reversing transmission are arranged on the output shaft of the gear shift transmission, the range-change transmission and the reversing transmission have a common intermediate shaft with two fixed gears, and the range-change transmission and the reversing transmission have synchronizing clutches.

A transmission of the invention of this type has, in an embodiment with eight drive speeds and eight reverse speeds, the advantage that it needs only fifteen gears, only six gears sets, and only eight synchronizing clutches. It has further the advantage that only the two least used synchronizing clutches are additionally loaded by the turning mass of only seven gears, namely either the synchronizing clutches of the range-change transmission or the synchronizing clutches of the reversing transmission.

This transmission can have on the output shaft of the gear-shift transmission which meshes with a fixed gear of the primary shaft of the main transmission, while a friction clutch connects the free gear with the output shaft of the gear shift transmission.

This transmission has the advantage that with one additional free gear and one additional friction clutch, a further power shiftable gear step and an full power shifting/shiftability through all forward and reverse speeds is reached.

Furthermore, the common intermediate shaft of the range-change transmission and of the reversing transmission can be arranged coaxially with the primary shaft of the main transmission and built as a hollow shaft, an extension of the primary shaft of the main transmission being inserted through this hollow intermediate shaft as an engine driven take-off shaft.

This transmission has the advantage of a particularly simple support of an engine driven take-off shaft in available shafting.

According to another feature of the invention, a split auxiliary transmission is arranged ahead of the main transmission, the split auxiliary transmission is built as planetary gearing, a friction clutch between the planet carrier and the output shaft of the planetary gear and a friction brake for the planet carrier make the split auxiliary transmission power shiftable; the primary shaft of the main transmission is built as a hollow shaft, and an extension of the primary shaft of the split transmission is inserted through the hollow primary shaft of the main transmission and the hollow intermediate shaft as an engine driven output shaft.

Here, the transmission has the advantage of a particularly reduced effort for a doubling of the number of power shiftable speed steps; the planetary gear and especially its clutch and its brake can be of very small size, since they have to withstand only reduced torque and reduced rotational speed differences.

The output shaft of the gear shift transmission can drive a main drive axle but is also extended towards the input side of the gear shift transmission as a ground driven take-off shaft and is connected with a further drive axle via a clutch.

This construction has the advantage of a particularly reduced effort for a ground driven take-off shaft and for the drive of an additional drive axle: the space required for the lengthening of the output shaft of the gear shift transmission is free and a simple stub-shaft connection is sufficient.

The power shift double clutch can also be used as a startup and disconnecting clutch. This has the special advantage that a dry main clutch can be eliminated, the gear shift transmission and the drive unit can be built together directly, the assembly is consequently shorter, lighter and less costly; no maintenance work is required at the couplings; no sealing problems are encountered, because the gear shift transmission and the drive unit can be run with the same oil.

BRIEF DESCRIPTION OF THE DRAWING

FIGS. 1-3 are gearing diagrams of respective embodiments of the invention.

SPECIFIC DESCRIPTION

Figure 3:
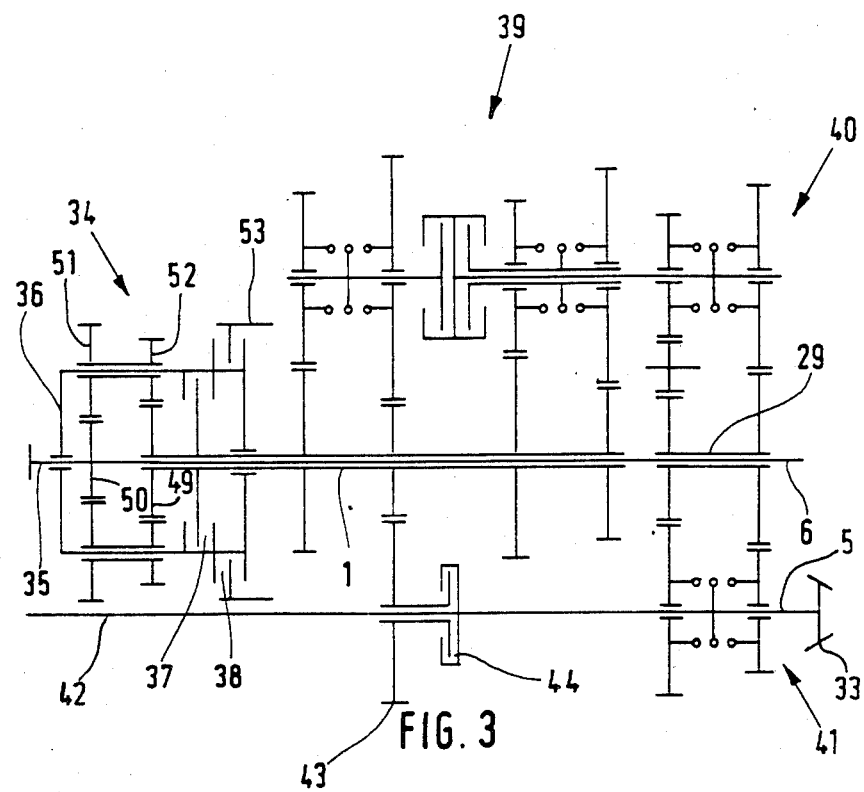

The usual developments and additions, as well as details which are not necessary to understand the concept of the invention, have been omitted from the drawing which shows the gearing in diagrammatic form only.

FIG. 1 shows a transmission in which a main input shaft 1 of a main transmission 39 carries fixed gears 21, 22, 23, 24 and is extended into a take-off shaft 6 via a common intermediate hollow shaft 29. The fixed gears mesh with the free gears 17, 18, 19, 20 of main transmission 39. The free gears 17 and 18 are pivoted on a secondary input shaft 2 of a friction clutch 7. The free gears 19 and 20 are pivoted on a hollow secondary input shaft 3 of a friction clutch 8. Both friction clutches 7 and 8 are structurally connected to a double clutch 7, 8. The free gears 17 and 18 can be alternatively coupled with the secondary input shaft 2 over the synchronizing clutches 9 and 10. The free gears 19 and 20 can be alternatively coupled with the hollow secondary input shaft 3 over the synchronizing clutches 11 and 12.

On a main-gear-set output shaft 4 of the double clutch 7, 8 free gears 25 and 26 of a reversing transmission 40 are pivoted. The free gears 25 and 26 can be alternatively coupled with the main-gear-set output shaft 4 of the double clutch 7, 8 over synchronizing reversing clutches 13 and 14. On an output shaft 5 of the gear-shift transmission the free gears 27 and 28 of a range-change transmission 41 are pivoted. The free gears 27 and 28 can be alternatively coupled with the final output shaft 5 having output gear 33 of the gear shift transmission via the synchronizing range-change clutches 15 and 16. The hollow intermediate shaft 29 carries fixed gears 30 and 31.

The fixed gear 30 meshes with the free gear 26 of the reversing transmission 40 and with the free gear 28 of the range-change transmission 41. The fixed gear 31 meshes with the free gear 27 of the range-change transmission 41 and the reversing idler 32. The reversing idler 32 meshes with the free gear 25 of the reversing transmission 40. The output shaft 5 of the gear shift transmission is extended towards the input side as a ground-driven take-off shaft 42.

FIG. 2: This embodiment differs from the one represented in FIG. 1 only by a few details: the free gears 25 and 26 of the reversing transmission 40 are pivoted on the output shaft 5 of the gear shift transmission; the free gears 27 and 28 of the range-change transmission 41 are pivoted on the main-gear-set output shaft 4 of the double clutch 7, 8. In addition the shaft 42 can be connected with a further drive axle 46 via a clutch 45.

FIG. 3: This embodiment is a further development of the one represented in FIG. 1. A split group planetary-gear transmission 34 is added. A planetary-gear output shaft 35 has a fixed sun gear 50 meshing with a gear 51 fixed to gear 52 and both rotatably mounted on planet carrier 36 of the planetary-gear transmission 34, shaft 35 extending via the hollow main input shaft 1 of the main transmission 39 and the hollow common intermediate shaft 29 into a take-off shaft 6. The planet carrier 36 of the planetary-gear transmission 34 can be coupled with the main input shaft 1 of the main transmission 39 via a friction clutch 37 in which case the whole planetary-gear transmission 34 runs as a clutch.

The planet carrier 36 can also alternatively be locked via a friction brake 38 with fixed friction surface 53 of the transmission housing in which case the planetary-gear transmission 34 becomes a stationary transmission with fixed sun gear 49 of shaft 1 meshing with gear 52 with low differences in rotation speed between the two shafts 35 and 1.

A free gear 43 of the final output shaft 5 of the gear shift transmission meshes with a fixed gear 22 of the main input shaft 1 of the main transmission 39. A friction clutch 44 connects the free gear 43 with the output shaft 5.

We claim:

1. A motor-vehicle transmission shiftable under load, comprising:
   a main gear set including:
      a main input shaft,
      respective gear trains defining two torque-transmitting paths, each of said gear trains having two selectively effective groups of gears including a gear fixed to said main input shaft and a free gear rotatable about an axis common to free gears of the other groups,
      a respective coaxial secondary input shaft for each train lying along said axis and carrying rotatably the free gears of the respective train,
      respective synchronizing clutches for selectively coupling one of said free gears rotatably with the respective secondary input shaft, and
      a double clutch disposed along said axis between said gear trains and formed as a unit with two selectively operable clutches each adapted to connect a respective one of said secondary input shafts with a single main-gear-set output shaft coaxial with said secondary input shafts, one of said secondary input shafts being hollow and journaled on said main-gear-set output shaft;
   a reversing gear set having:
      a pair of free gears rotatable on a common axis,
      a reversing clutch selectively coupling said free gears of said reversing gear set to select an output rotation direction of the transmission, and
      fixed gears cooperating with said free gears of said reversing gear set to define opposite-sense rotational directions in accordance with the free gear coupled to the reversing clutch;
   a range change gear set coupled to said reversing gear set and including:
      a pair of free gears rotatable about a common axis, a range-change clutch selectively coupling said free gears of said range change gear set to select respective speed ranges in accordance with the free gear coupled to said range-change clutch, said free gears of said range change gear set cooperating with said fixed gears of said reversing gear set;

a common shaft fixed to and carrying said fixed gears of said reversing gear set and said range change gear set;

a final output shaft parallel to but offset from said common shaft, said free gears and said range-change clutch of said range change gear set being provided on one of said output shafts and said free gears and said reversing clutch of said reversing gear set being provided on the other of said output shafts; and an output gear on said final output shaft for driving wheels of said vehicle.

2. The transmission defined in claim 1 wherein said free gears and said reversing clutch of said reversing-gear set are provided on said main-gear-set output shaft and said free gears and said range-change clutch of said range-change gear set are provided on said final output shaft.

3. The transmission defined in claim 2 wherein said final output shaft comprises an additional friction clutch and an additional free gear, said additional free gear meshing with one of said fixed gears on said main input shaft, said one of said fixed gears, said additional free gear and said additional friction clutch forming a medium-range stage of the range-change gear set.

4. The transmission defined in claim 2 wherein said common shaft is a hollow shaft formed coaxially with and surrounding said main input shaft, said main input shaft extending through said common shaft to form an engine-driven takeoff shaft.

5. The transmission defined in claim 2 wherein said main input shaft is hollow and coaxial with a planetary-gear output shaft of a planetary transmission and carries a first sun gear thereof, said planetary-gear output shaft of said planetry transmission carrying a further sun gear thereof, said planetary transmission having a planet carrier with planetary gears meshing with said sun gears, a friction clutch for connecting said planetary carrier to said main input shaft for rotation therewith, and a friction brake for rotationally locking said planet carrier to a housing of the motor vehicle transmission.

6. The transmission defined in claim 2 wherein said final output shaft is axially extended away from said output gear to form a power takeoff shaft.

7. The transmission defined in claim 6 wherein said power takeoff shaft is provided with a clutch connected to a further drive axle.

8. The transmission defined in claim 1 wherein said free gears and range-change clutch of said range-change gear set are provided on said main-gear-set output shaft and said free gears and said reversing clutch are provided on said final output shaft.

* * * * *